US005557067A

United States Patent [19]

Messelhi

[11] Patent Number: 5,557,067
[45] Date of Patent: Sep. 17, 1996

[54] POLE MOUNTED TERMINAL HOUSING

[75] Inventor: Selim Messelhi, Etobicoke, Canada

[73] Assignee: Communications Technology Corporation, Dallas, Tex.

[21] Appl. No.: 96,051

[22] Filed: Jul. 22, 1993

[51] Int. Cl.$^6$ ................................................... H02G 3/18
[52] U.S. Cl. ................................ 174/59; 174/67; 16/271
[58] Field of Search ................................. 174/59, 60, 67; 220/334, 337, 340; 16/271, 355, 362

[56] References Cited

U.S. PATENT DOCUMENTS

| 1,436,951 | 11/1922 | De Waters | 16/362 X |
| 1,660,815 | 2/1928 | Persons | 174/60 |
| 1,862,811 | 6/1932 | Strong | 174/59 |
| 2,104,430 | 1/1938 | MacEvoy | 16/362 X |
| 3,147,338 | 9/1964 | Ekvall et al. | 174/138 F |
| 3,325,591 | 6/1967 | Wahl | 174/138 F |
| 4,128,739 | 12/1978 | Bernstein | 379/19 |
| 4,428,634 | 1/1984 | Waas | 439/140 |
| 4,449,015 | 5/1984 | Hotchkiss et al. | 174/138 F |
| 4,721,830 | 1/1988 | Dagan et al. | 174/41 |
| 4,932,744 | 6/1990 | Messelhi | 385/99 |
| 5,001,300 | 3/1991 | Messelhi | 174/87 |
| 5,245,507 | 9/1993 | Ericksen | 174/67 X |

Primary Examiner—Kristine L. Kincaid
Assistant Examiner—Michael J. Cornelison
Attorney, Agent, or Firm—Crutsinger & Booth

[57] ABSTRACT

A water-proof housing for a telecommunications terminal. The housing has a body portion and a hinged closure portion, hinge elements on the body portion and on the closure portion being configured to permit linear sliding movement of the closure longitudinally of an axis to a predetermined position and pivotal movement of the closure portion relative to the body portion when the closure portion is in a predetermined position relative to the body portion. A tongue formed by spaced tabs, one of the tabs being longer than the other tabs is sliceable through a guideway in a channel member on the closure portion of the housing such that when the long tab is aligned with a corresponding opening in the channel member, the closure portion of the housing can be rotated about the axis.

22 Claims, 9 Drawing Sheets 5,557,067

POLE MOUNTED TERMINAL HOUSING

TECHNICAL FIELD

The invention relates to improvements in a pole or wall mounted telecommunications terminal housing.

BACKGROUND OF INVENTION

Pole or wall mounted telecommunications terminal housings that incorporate a front panel that slides straight down to provide access to the termination area inside the housing are commercially available from Communications Technology Corporation of Dallas, Tex., under the registered trademark "POLECAT."

The sliding door provides access during installation to the sides of the housing for inserting or terminating service wires in terminal blocks inside the terminal housing. However, a shortcoming to such a sliding door is that when it slides down, maintenance performed from a ladder leaning against the pole or wall supporting the housing is more difficult, and, indeed, unnecessarily difficult when such maintenance does not require access to the sides of the housing.

SUMMARY OF INVENTION

A preferred embodiment of the invention incorporates improvements to a housing for telecommunications terminals using a closure that may be opened by sliding it across the open face of the housing or by swinging it open as a door pivots on a hinge.

The front of the housing on which the closure fits has spaced tabs forming a tongue on one edge which align with slots between spaced tabs at the corresponding positions on the closure. On the opposite front edge of the housing, a hinge assembly is attached which has a longitudinal slot adjacent the edge. The closure is provided with a hinge pin in the position corresponding to the hinge assembly on the housing.

A first array of hinge elements on the body portion have concave surfaces forming an elongated receptacle and a second array of spaced hinge elements on the closure portion have spaced convex surfaces. The first and second arrays of hinge elements are connectable to permit both sliding movement of the closure portion of the housing longitudinally of an axis and pivotal movement of the closure portion relative to the body portion. A tongue formed by spaced tabs on the body portion and a generally channel-shaped member, having spaced flange portions and a web portion, one of the flange portions having spaced cutouts positioned in alignment with the spaced tabs when the closure portion is in a predetermined position relative to the body portion, permits pivotal movement of the closure portion relative to the body portion. The cutouts are positioned to prevent pivotal movement of the closure portion relative to the body portion when the closure portion is slid to any position other than the predetermined position wherein the cutouts are in alignment with the spaced tabs.

The hinges are made of plastic or other resilient material and have enough flexibility to allow the closure to be totally removed from the body portion of the housing through the hinge and lip slots, thus allowing maintenance on the unit without dismantling the entire housing. The door can be refitted onto the housing by simply snapping it back into place.

DESCRIPTION OF DRAWINGS

Drawings of a preferred embodiment of the invention are annexed hereto so that the invention may be better and more fully understood, in which.

Numeral references are employed to designate like parts throughout the various figures of the drawing.

DESCRIPTION OF A PREFERRED EMBODIMENT

Figure 1:
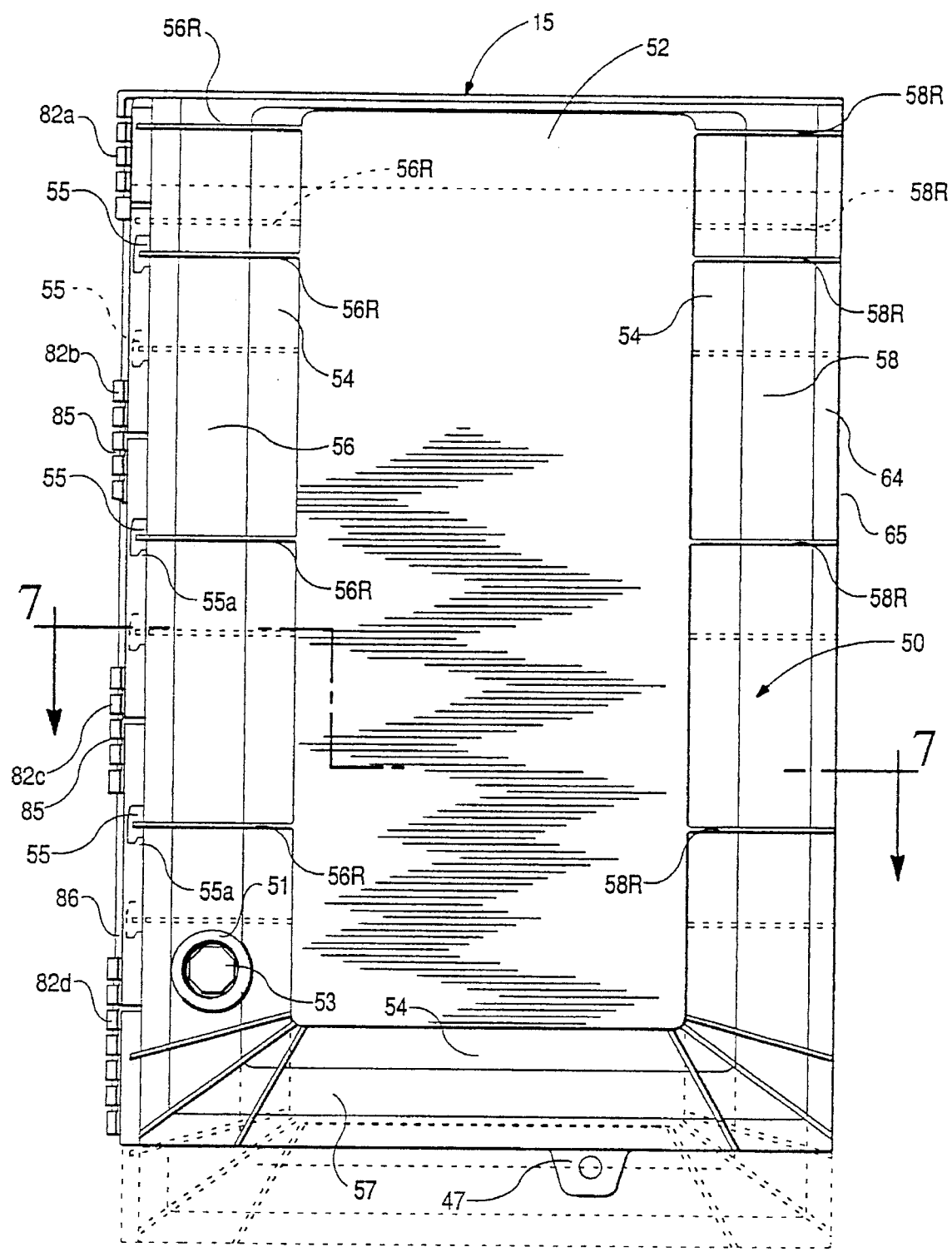
FIG. 1 is a front elevational view of the terminal housing.

Referring to FIGS. 1–7 of the drawings, the numeral 15 general designates a terminal housing having a body portion 20 and a hinged closure portion 50 connected to form a waterproof container for telecommunications terminals.

Referring to FIGS. 7–10, the body portion 20 of terminal housing 15 has a back wall 22 having a pair of spaced rails 21 and 23 formed on the outer surface thereof and a pair of spaced generally parallel troughs 21a and 23a formed in the inner wall. A pair of bosses 21b and 21c are formed in rail 21 and bosses 23b and 23c are formed in rail 23. Each boss has an opening therein for receiving screws for securing body portion 20 to a mounting bracket (not shown) for attachment to a post, wall or other suitable supporting structure.

Inclined wing sections 24 and 26 extend outwardly from lateral edges of the central section 22 of the back wall and have spaced rows of passages 25 and 27 formed therein.

Figure 7:
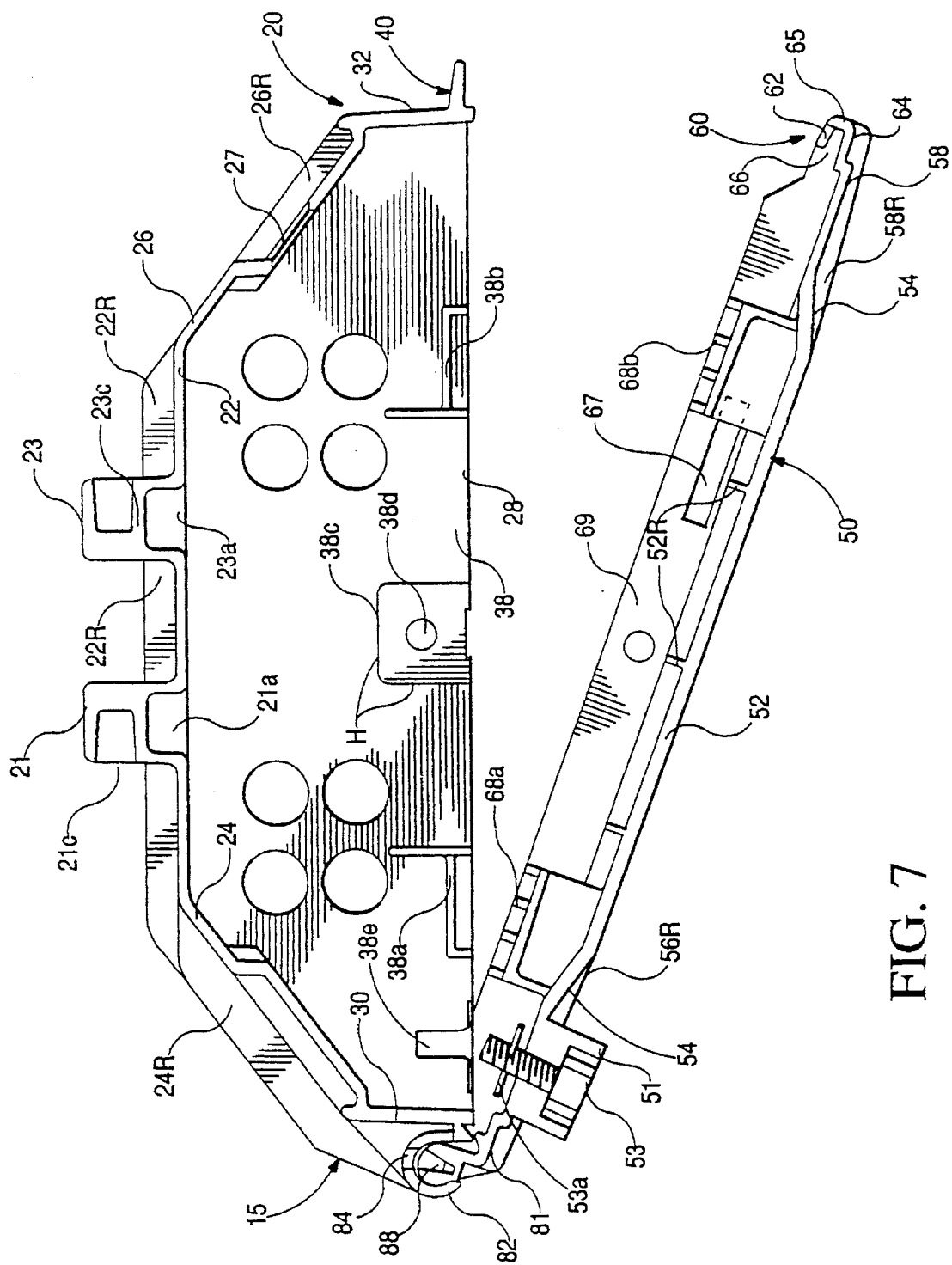
FIG. 7 is a cross-sectional view taken substantially along line 7—7 of FIG. 1, the closure portion of the terminal housing being illustrated in a partially open position.
Figure 8:
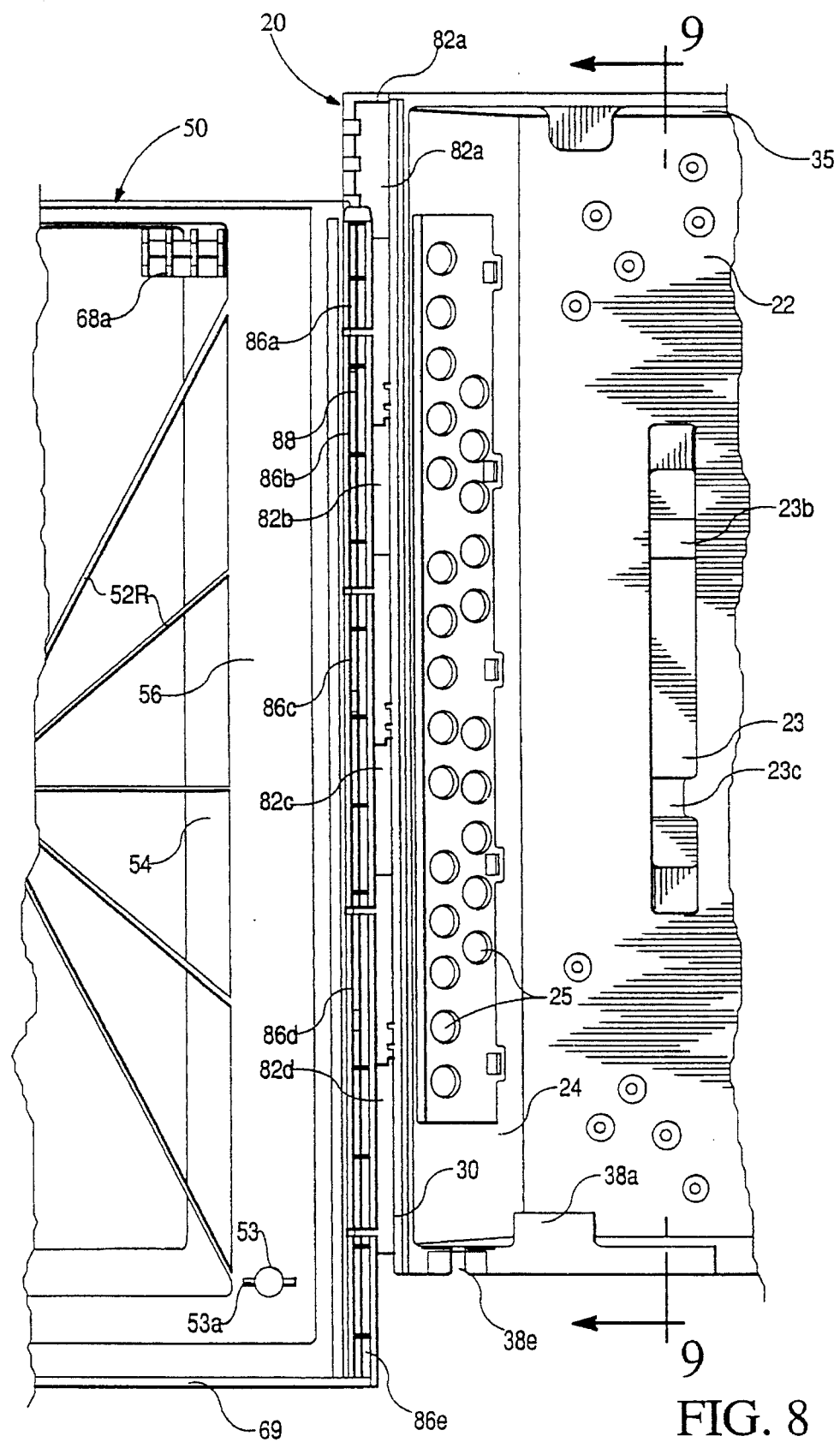
FIG. 8 is a fragmentary elevational view of hinge elements on the body portion and the closure portion of the terminal housing as illustrated when the closure portion is in an open position.

Sidewalls 30 and 32 are formed on wing sections 24 and 27, respectively, as best illustrated in FIG. 7 of the drawings.

Figure 9:
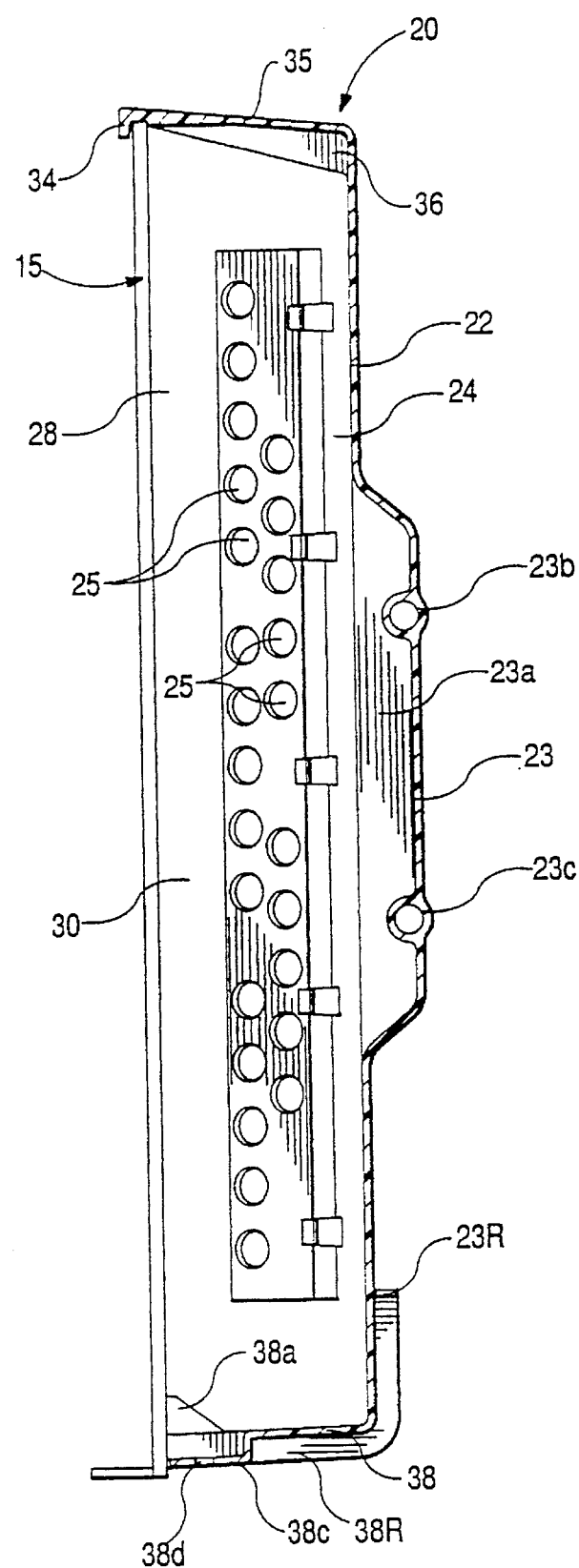
FIG. 9 is a cross-sectional view taken substantially along line 9—9 of FIG. 8.

As best illustrated in FIG. 9 of the drawing, a top wall 35 and bottom wall 38 extend across upper and lower ends of the central section 22 of the back wall, wing sections 24 and 26 and side walls 30 and 32 to form a generally rectangular shaped container having a front access opening 28 into the body portion 20 of the terminal housing 15.

Figure 2:
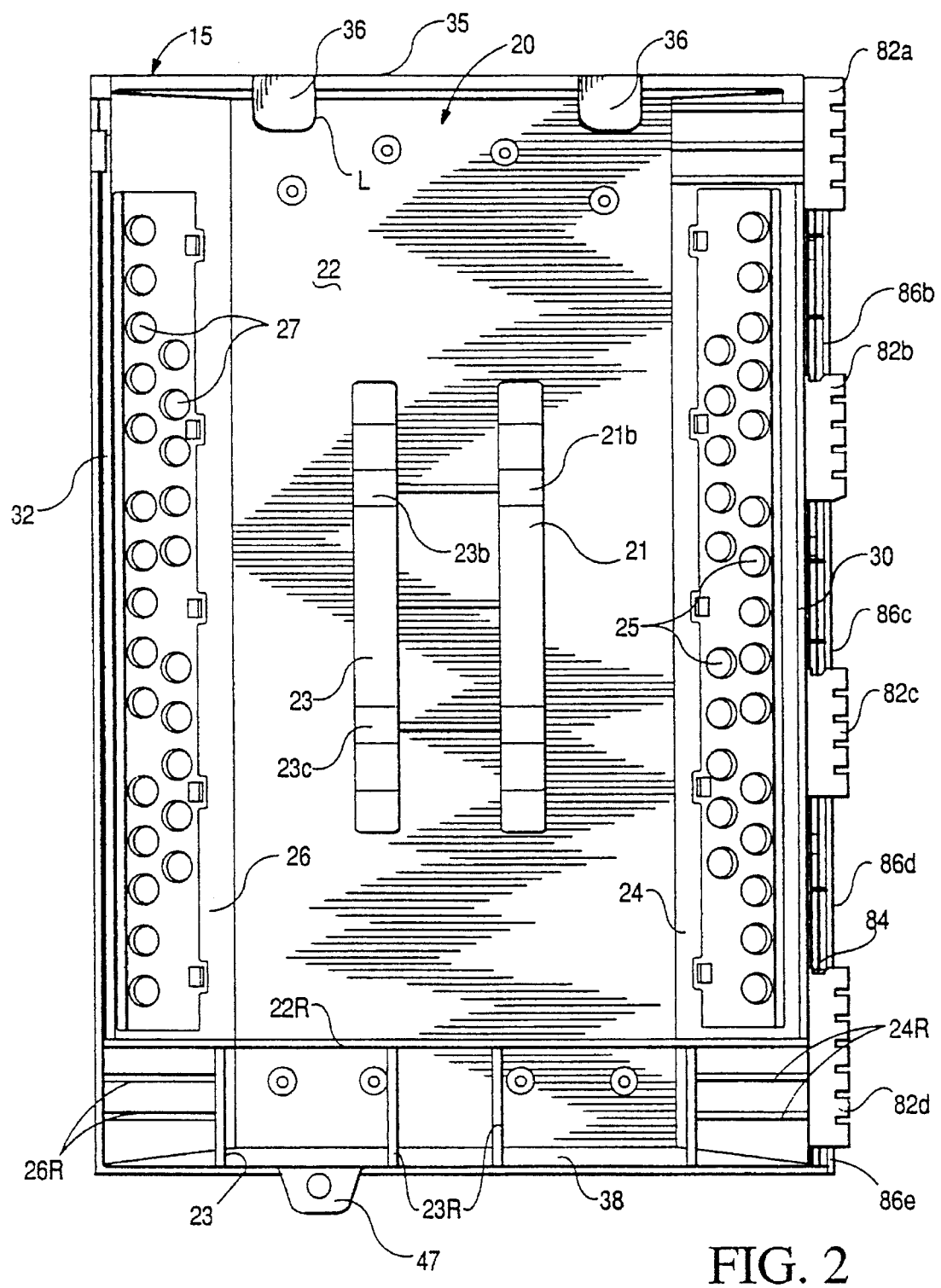
FIG. 2 is a rear elevational view of the terminal housing.

As best illustrated in FIGS. 2 and 9 of the drawing, top wall 35 has a pair of inwardly extending ribs 36 formed therein for stiffening to top wall 35.

Figure 3:
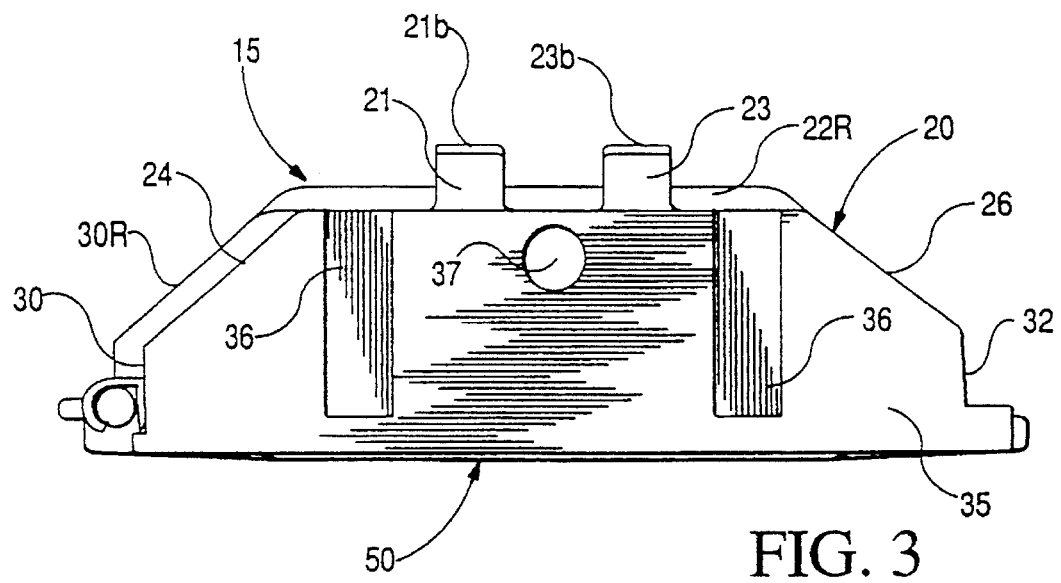
FIG. 3 is a top plan view.

As best illustrated in FIG. 3 of the drawing, a knockout 37 is formed in top wall 35 for forming an opening through which a telecommunications cable can be inserted into the interior of the body portion 20 of the terminal housing 15. A plurality of knockouts 39 are formed in bottom wall 38.

Wires may enter or exit terminal housing 15 through a top cable stub entry/exit passage formed when knockout 37 is removed, through bottom cable entry/exit passages formed when one or more knockouts 39 are removed; or through side cable entry/exit passages 25 and 27 formed in inclined wing sections 24 and 26. Resilient grommets or other suitable water proofing material is preferably provided for preventing entry of water, insects, plants and other hazards through the entry/exit passages.

Mounting rings (not shown) on the inside of terminal housing 15 allow wire entering from the bottom of terminal housing 15 to be routed around terminal blocks (not shown) and attached where appropriate.

As best illustrated in FIGS. 4, 7, 9 and 10 of the drawing, bottom wall 38 has a pair of doorstop members 38a and 38b formed on the inner surface adjacent the front edge thereof and a boss 38c having a hole 38d configured to receive a locking bolt for locking a closure portion 50 of terminal housing 15 to the body portion 20, as will be hereinafter more fully explained.

A slot 38e, best illustrated in FIG. 7, is formed in the bottom wall 38 adjacent side wall 30 for receiving a closure mode selector pin 53a as will be hereinafter more fully explained.

Figure 10:
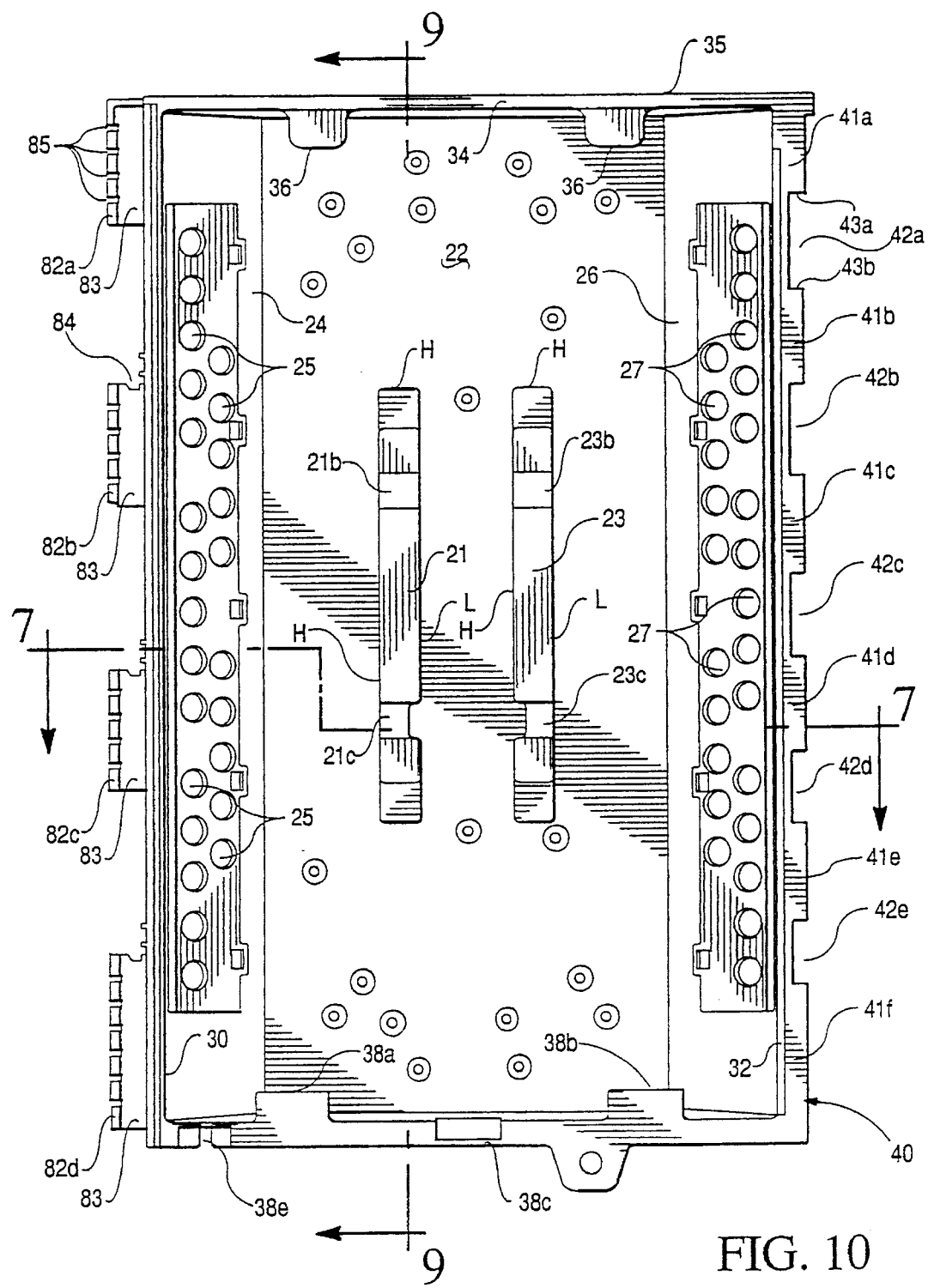
FIG. 10 is an elevational view illustrating the inside of the body portion of the terminal housing.

As best illustrated in FIGS. 7 and 10 of the drawing, a tongue 40 formed of spaced tabs 41a, 41b, 41c, 41d, 41e and 41f separated by spaced slots 42a, 42b, 42c, 42d and 42e extend outwardly from side wall 32 of body portion 20 for controlling movement of the closure portion, as will be hereinafter more fully explained.

It should be noted that slots 42a–42e are sized such that each slot is progressively narrower, slot 42a being the widest and slot 42e being the most narrow.

As best illustrated in FIGS. 3–7 of the drawing, stiffener ribs 22R, 24R, 26R and 30R are formed on outer walls of body portion 20 of terminal housing 15 to provide a strong rigid, light-weight structure for supporting the closure portion of the housing, as will be hereinafter more fully explained.

As best illustrated in FIG. 9 of the drawing, a lip 34 extends along the front edge of top wall 35 to capture the upper edge of the closure portion of the housing when the closure portion is in the closed position and to prevent entry of water around the upper edge of the closure portion of the housing.

Figure 11:
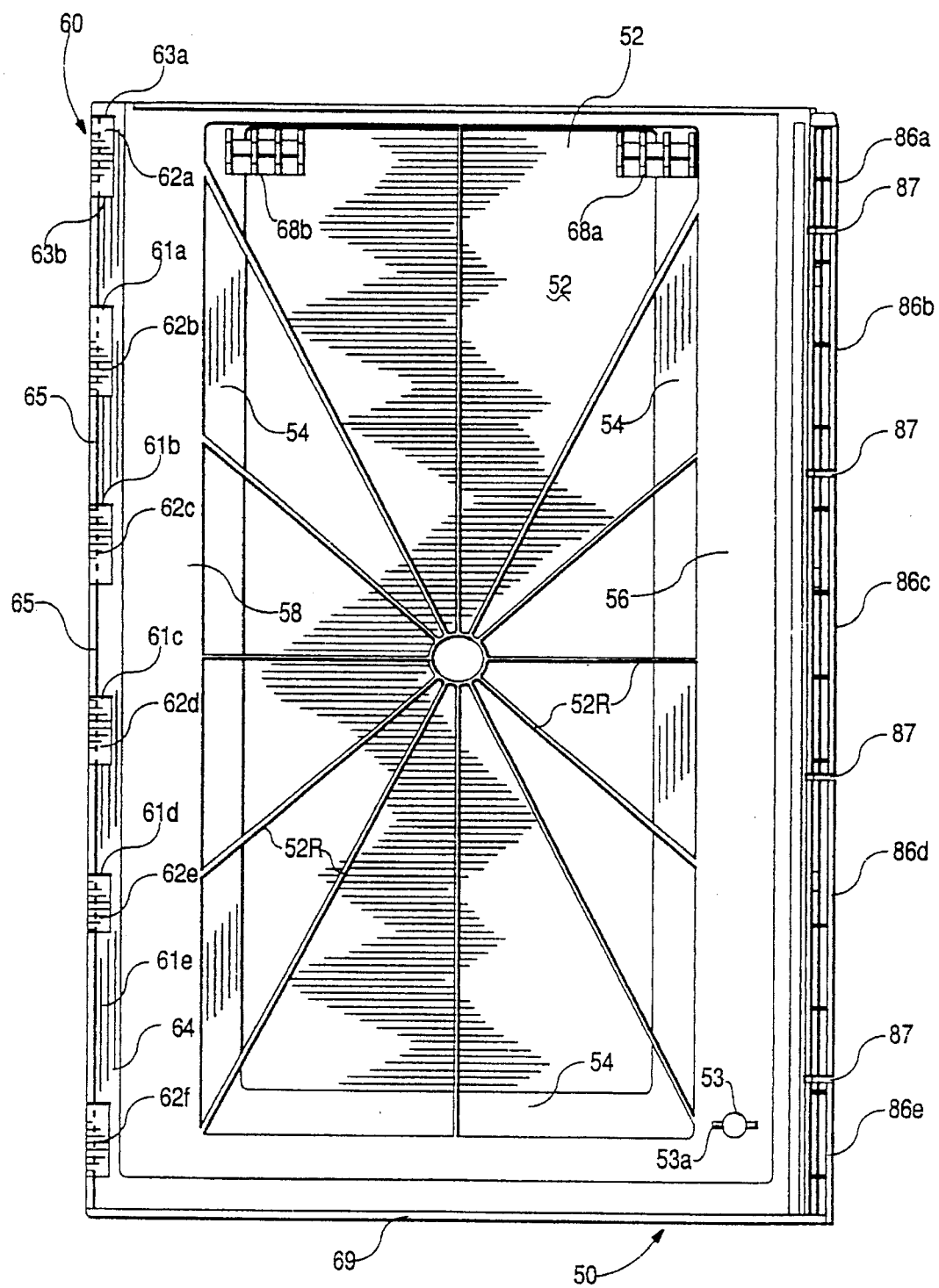
FIG. 11 is an elevational view of the inside of the closure portion of the terminal housing.

The closure portion 50 of the housing is best illustrated in FIGS. 1, 7 and 11 of the drawing and forms a door for covering the front access opening 28 into the interior of the body portion 20 of housing 15. Closure portion 50 is formed by a generally flat central section 52 bounded on three sides by deflected sections 54 which in turn are bounded by edge sections 56, 57 and 58.

As best illustrated in FIGS. 1 and 7 of the drawing, stiffener ribs 56R and 58R are formed on the outer surface of closure portion 50. Referring to FIGS. 7 and 11 of the drawing, stiffener ribs 52R are formed on the inner surface of central section 52 and deflected sections 54 to form a strong rigid closure for the housing.

As best illustrated in FIG. 7 of the drawing, a generally channel-shaped member 60, extending along the outer edge of edge section 58, is formed by flange members 62 and 64 joined by a web member 65. As best illustrated in FIG. 11 of the drawing, portions of the inner web member 62 are cut away for forming spaced inwardly extending tabs 62a, 62b, 62c, 62d, 62e and 62f. Cut out portions 61a, 61b, 61c, 61d and 61e are sized to permit movement of closure portion 50 relative to body portion 20 when the upper edge 63a (FIG. 11) of tab 62a is positioned below the edge 43a (FIG. 10) of tab 41a on body portion 20 and when the lower edge 63b of tab 62a is positioned slightly above edge 43b of tab 41b.

A mode selector switch, best illustrated in FIGS. 1, 7, 8 and 11, is formed by a hex-headed bolt 53 extending through an opening in a boss 51 on closure portion 50 and provided with a laterally extending guide pin 53a. The bolt can be rotated a quarter turn using a terminal wrench to enable the closure portion 50 to either slide open vertically or to swing open pivoting on hinge pins 86.

The guide pin 53a may be oriented either vertically or horizontally depending on the how the mode selector switch is set. If pin 53a is vertical, then the closure can be opened by sliding closure portion 50 vertically because bolt 53 and guide pin 53a will move through slot 38e in the bottom wall 38 of the body of the terminal housing 15. If pin 53a is horizontal, it will not pass through slot 38e. The closure portion 50 can slide down a predetermined distance, for example, about two inches until guide pin 53a engages the floor 38 of the housing 20. When closure portion 50, illustrated in FIG. 11, is in this predetermined position, tabs 62a–62e on closure portion 50 will be positioned in slots 42a–42e in body portion 20, illustrated in FIG. 10, to allow closure portion 50 to be swung open about the axis of hinge 80.

Bolt 53 also guides pin projections 86a–86e vertically when closure portion 50 is swung closed so that tabs 62a–62e on closure 50 will be properly aligned with slots 42a–42e on body portion 20 to assure that tabs 41b–41f on body portion 20 will be properly positioned in guideway 66 in channel shaped member 60.

Tabs 62a, 62b, 62c, 62d, 62e and 62f on closure portion 50 are approximately the same size and spacing as slots 42a, 42b, 42c, 42d and 42e, respectively, on body portion 20 of the terminal housing 15.

Flanges 62 and 64 and web 65, as illustrated in FIG. 7, form a guideway 66 in which tongue 40 on body portion 20 is slidable.

A pair of door stops 68a and 68b are formed adjacent the upper edge of closure portion 50 and are positioned to engage door stop members 38a and 38b when closure portion 50 is slid downward relative to body portion 20.

As best illustrated in FIG. 9 of the drawing, doorstop members 38a and 38b on bottom wall 38 of body portion 20 of the terminal housing are preferably generally wedge-shaped and the underside of doorstop members 68a and 68b on closure portion 50 are similarly shaped such that inclined surfaces on stops 38 and 68 lock together when the closure portion is in its lowermost position.

Figure 4:
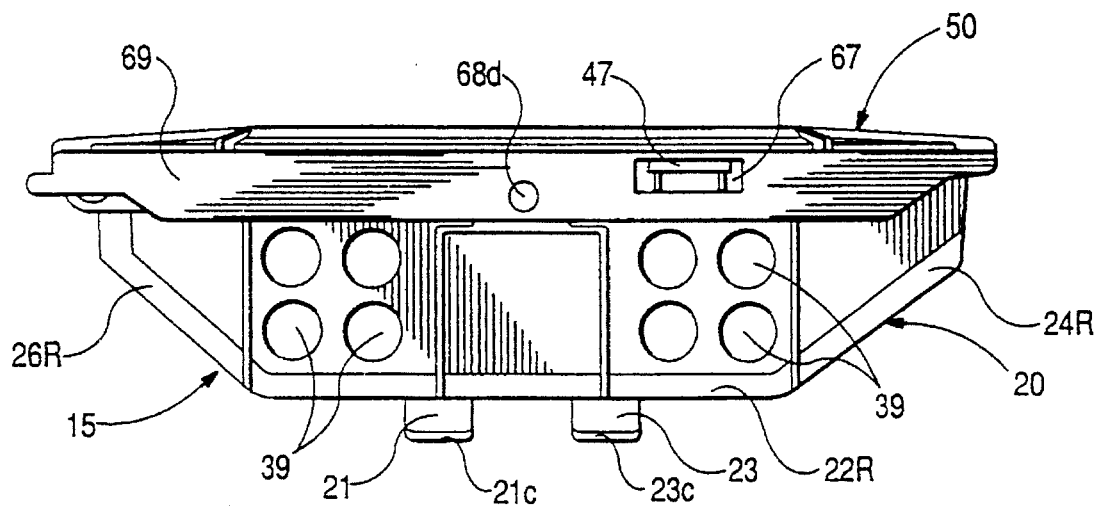
FIG. 4 is a bottom plan view.
Figures 5, 6:
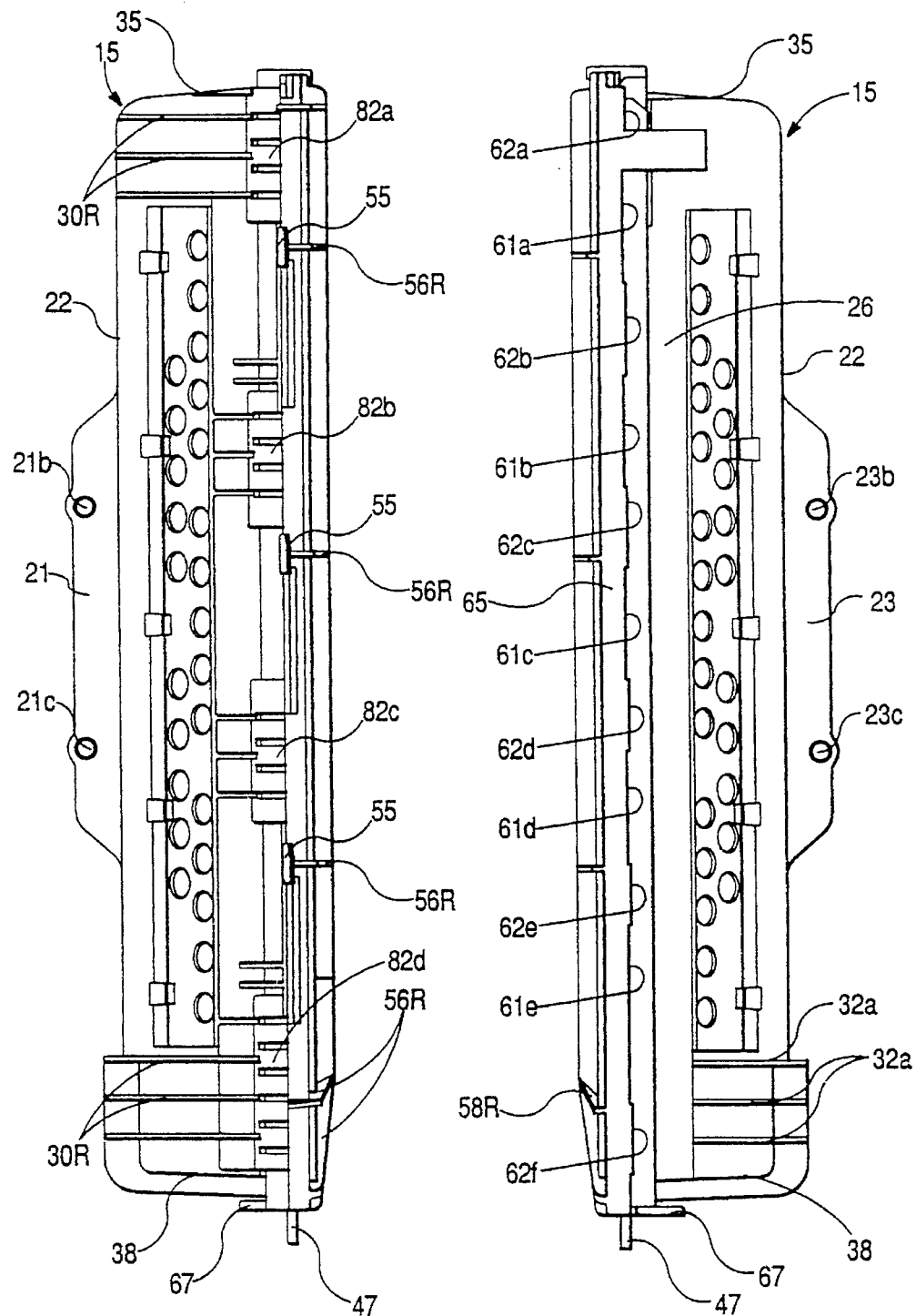
FIG. 5 is a left side elevational view.
FIG. 6 is a right side elevational view.

A ledge 69 extends across the lower end of closure portion 50, as best illustrated in FIGS. 4 and 7 of the drawing. Ledge 69 has an opening 68d extending through a central portion thereof for receiving a locking bolt (not shown) which screws into an opening 38d formed in the bottom wall 38 of body portion 20 of the housing for maintaining closure portion 20 in its locked and closed position.

A locking lug 47 extends downward from bottom wall 38 of the body portion 20 and extends through an opening 67 formed in ledge 69 on closure portion 50. Lug 47 has an opening formed therein to receive a padlock for securing closure portion 50 in a closed position and to prevent unauthorized entry into the interior of terminal housing 15.

A hinge, generally designated by the numeral 80 is best illustrated in FIGS. 7, 10 and 11 of the drawing.

Spaced substantially semi-cylindrical projections 82a, 82b, 82c and 82d are formed on wall 30 of the body portion 20 of the housing. Projections 82 have concave inner surfaces 83 formed on the interior thereof. Projections 82b, 82c and 82d have notches 84 formed in the upper end thereof and have slots 85 formed in the cylinder wall.

Referring to FIGS. 7 and 11, cylindrical pin projections 86a, 86b, 86c, 86d and 86e are formed on edge section 56 of closure portion 50 of terminal housing 15. Cylindrical pin projections 86 have slots 85 spaced along the length thereof to permit slight deflection of the cylindrical pin projection 86 for alignment with semi-cylindrical projections 82 on body portion 20. Cylindrical pin projection 86 further has a longitudinally extending groove 88 formed therein such that it is deformable to facilitate snapping cylindrical pin projection 86 into the semi-cylindrical projection 82.

Latch members 55 are formed on ribs 56R on edge section 56 of closure portion 50. Each latch member 55 has a notch 55a formed in its lower surface. Latch members 55 ride along the upper surface of semi-cylindrical projections 82 as closure portion 50 is rotated toward an open position. When the closure portion 50 is in its fully open position, the lower edge of latch 55 drops into notch 84 formed in the upper surface of each cylindrical member 82. Thus, gravity maintains the latch 55 in notch 84 for holding the door open. For closing the door, the closure portion is urged upwardly for disengaging latch 55 from notch 84 permitting the door to rotate to a closed position.

It should appreciated that other and further embodiments of the invention may be devised without departing from the spirit and scope of the appended claims.

I claim:

1. A housing having a body portion and a hinged closure portion, the improvements comprising: hinge elements on the body portion and the closure portion, a first hinge element on said body portion being arranged to join with a second hinge element on the closure portion, said first and second hinge elements being configured to permit linear sliding movement of the closure portion longitudinally of an axis to a predetermined position and pivotal movement of the closure portion relative to the body portion when the closure portion is in said predetermined position relative to the body portion; and selector means on said closure portion rotatable to one position for said closure means to pivot open on said hinge elements, and rotatable to another position for said closure means to slide longitudinally relative to said body portion.

2. A molded plastic housing having a body portion and a hinged closure portion, said body portion having an opening with first and second edges, the improvements comprising: a flange on said closure portion adjacent said first edge of said opening, said flange having a slot formed therein; said body portion of said housing having a tongue, said tongue being movable through said slot when said closure portion is in a predetermined position relative to said body portion; and hinge elements formed on the body portion adjacent said second edge of said opening and on the closure portion, a first hinge element on said body portion being arranged joined with a second hinge element on the closure portion, said first and second hinge elements being configured to permit linear sliding movement of the closure portion longitudinally of an axis from a closed position to said predetermined position and pivotal movement of the closure portion relative to the body portion when the closure portion is in said predetermined position relative to the body portion.

3. A housing having a body portion and a hinged closure portion, the improvements comprising: hinge elements on the body portion and the closure portion, a first hinge element on said body portion being arranged to join with a second hinge element on the closure portion, said first and second hinge elements being configured to permit linear sliding movement of the closure portion longitudinally of an axis to a predetermined position and pivotal movement of the closure portion relative to the body portion when the closure portion is in said predetermined position relative to the body portion, a tongue formed by spaced tabs on said body portion, a protrusion on said closure portion having a longitudinally extending guideway, said protrusion having at least one transverse slot communicating with said guideway, said spaced tabs on said body portion extending through said slot into said guideway to permit pivotal movement of said closure portion relative to said body portion when said closure portion is in said predetermined position.

4. A housing having a body portion and a hinged closure portion, the improvements comprising: hinge elements on the body portion and the closure portion, a first hinge element on said body portion being arranged to join with a second hinge element on the closure portion, said first and second hinge elements being configured to permit linear sliding movement of the closure portion longitudinally of an axis to a predetermined position and pivotal movement of the closure portion relative to the body portion when the closure portion is in said predetermined position relative to the body portion one of said housing portions having a generally channel-shaped member formed thereon, said channel-shaped member having spaced flange portions and a web portion, one of said flange portions having cutouts formed therein, the other of said housing portions having spaced tabs, said cutouts being positioned in alignment with said spaced tabs when said closure portion is in said predetermined position such that said spaced tabs are moveable through said cutouts upon pivotal movement of said closure portion about said axis.

5. A housing having a body portion and a hinged closure portion, the improvements comprising: a projection on said body portion having concave surfaces forming an elongated receptacle; and a hinge element on the closure portion, said projection and said hinge element being configured to permit linear sliding movement of the closure portion longitudinally of an axis to a predetermined position and pivotal movement of the closure portion relative to the body portion when the closure portion is in said predetermined position relative to the body portion.

6. A housing having a body portion and a hinged closure portion according to claim 5, said hinge element comprising: a projection on said closure portion having a convex surface, said convex surface being moveable longitudinally of said longitudinally extending receptacle to said predetermined position.

7. A housing having a body portion and a hinged closure portion according to claim 6, said projection on said closure portion having a groove configured to permit limited deformation of said convex surface for positioning said convex surface adjacent said concave surfaces in said elongated receptacle.

8. A housing having a body portion and a hinged closure portion according to claim 7, said first hinge element having at least one slot.

9. A housing having a body portion and a hinged closure portion according to claim 8, said projection on said closure portion having at least one rib, said rib being positioned adjacent said slot when said closure portion is in said predetermined position, said rib being moveable through said slot during pivotal movement of said closure portion about said axis to limit sliding movement of said closure portion relative to said body portion.

10. A housing having a body portion and a hinged closure portion according to claim 6, one of said projections having a notch formed therein and the other of said projections having a latch element such that when said closure portion of said housing is in a fully open position, the lower edge of said latch drops into said notch to hold said closure portion in said open position.

11. A housing having a body portion and a hinged closure portion, the improvements comprising: hinge elements on the body portion and the closure portion, a first hinge element on said body portion being arranged to join with a second hinge element on the closure portion, said first and second hinge elements being configured to permit linear sliding movement of the closure portion longitudinally of an axis to a predetermined position and pivotal movement of the closure portion relative to the body portion when the closure portion is in said predetermined position relative to the body portion, a selector switch on said closure portion, said selector switch being configured to selectively limit movement of said closure portion between a closed position and said predetermined position or to permit movement of said closure portion past said predetermined position and with the addition of a selector switch on said closure portion, said selector switch being configured to selectively limit movement of said closure portion between a closed position and said predetermined position or to permit movement of said closure portion past said predetermined position.

12. A housing for a telecommunications terminal having a body portion and a closure portion comprising: a first array of hinge elements on the body portion having concave surfaces forming an elongated receptacle; a second array of spaced hinge elements on said closure portion having spaced convex surfaces, said first and second arrays of hinge elements being connectable to permit sliding movement of the closure portion of the housing longitudinally of an axis and pivotal movement of the closure portion about said axis relative to the body portion; a tongue formed by spaced tabs on said body portion; and a generally channel-shaped member having spaced flange portions and a web portion, one of said flange portions having spaced cutouts positioned in alignment with said spaced tabs when said closure portion is in a predetermined position relative to said body portion to permit pivotal movement of said closure portion relative to said body portion, said cutouts being positioned to prevent pivotal movement of said closure portion relative to said body portion when said closure portion is slid to any position other than said predetermined position wherein said cutouts are in alignment with said spaced tabs.

13. A housing according to claim 12, said body portion and said hinge portion of said housing being formed of non-corrosive material.

14. A housing according to claim 12, said first array of hinge elements having a longitudinally extending slot formed such that said concave surfaces extend more than 180° around said axis.

15. A housing according to claim 14, said second array of hinge elements having a groove configured to permit limited deformation of said convex surfaces for positioning said convex surfaces adjacent said concave surfaces in said elongated receptacle.

16. A housing according to claim 12, one of said tabs being a control tab which is longer than the other of said tabs and said cutouts being sized such that said closure portion is only free to pivot about said axis when said control tab is in said predetermined position.

17. A housing for a telecommunications terminal comprising: container means having an opening; spaced tabs on said container means adjacent a first edge of said opening; hollow cylindrical means on said container means adjacent a second edge of said opening, said hollow cylindrical means having a longitudinally extending slot and an arcuately extending surface; closure means to close said opening in said container means; a projection on said closure means positionable in said hollow cylindrical means; a generally U-shaped channel member on said closure means having a guideway through which said tabs on said container means are slidable, said channel member having a cutout portion communicating with said guideway to permit pivotal movement of said closure means relative to said container means when said cutout portion and said tabs are in alignment, said channel member preventing pivotal movement of said closure means relative to said container means when said tabs are in said guideway if said tab is not in alignment with said cutout portion.

18. Apparatus to house a telecommunications terminal, comprising: container means having spaced sidewalls and top and bottom walls extending around an access opening; closure means to close said access opening; slotted tabs on one of said sidewalls adjacent said access opening and on said closure means; hollow cylindrical means attached to the other of said side walls adjacent said access opening, said hollow cylindrical means having along its entire length a longitudinal slot; shaft means on said closure means, said shaft means having an outside diameter slightly smaller than the inside diameter of said hollow cylindrical means such that said shaft means can rotate within said hollow cylindrical means; and selector means on said closure means positioned relative to said slotted tabs such that:

(1) said slotted tabs can pass through slots of slotted groove means permitting said closure means to pivot open on said hollow cylindrical means, or, (2) said slotted tabs can guide said closure means while said closure means slides along said side walls of said container means.

19. Apparatus as recited in claim 18, said hollow cylindrical means being sufficiently resilient to permit said closure means to be totally removed from said container means by applying outward force to said shaft means transversely from said hollow cylindrical means.

20. Apparatus as recited in claim 19, wherein said slotted groove means and slotted tab means are different lengths such that said closure means can pivot open from only one position.

21. Apparatus as recited in claim 19, said hollow cylindrical means having notches; and latch means on said shaft means positioned such that said latch means sits in said notches when said closure means is fully open.

22. Apparatus as recited in claim 18, wherein selector means are rotatable to one position for said closure means to pivot open on said hollow cylindrical means, and rotatable to another position for the closure means to slide across the face of said container means.

* * * * *